Jan. 30, 1923.
M. McCANN.
DRIVING MECHANISM FOR LIGHT MACHINES.
FILED AUG. 18, 1921.
1,443,793.
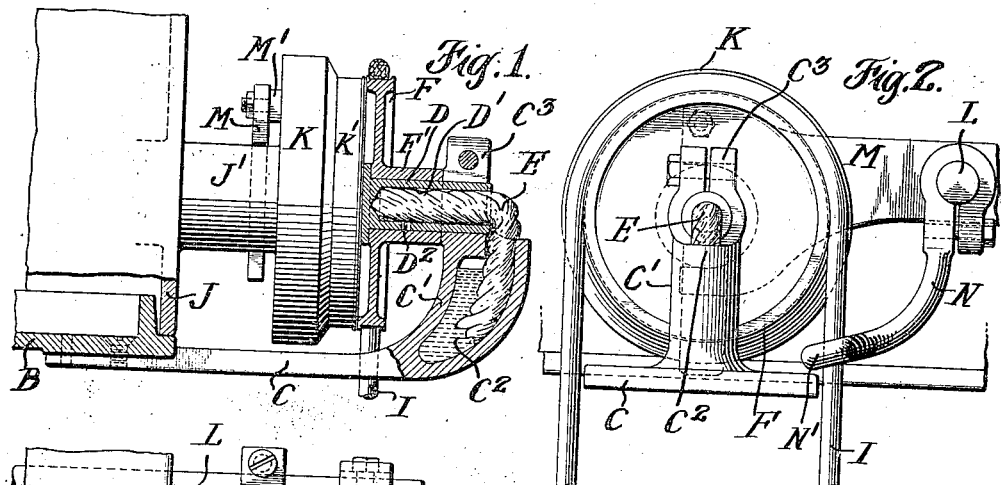
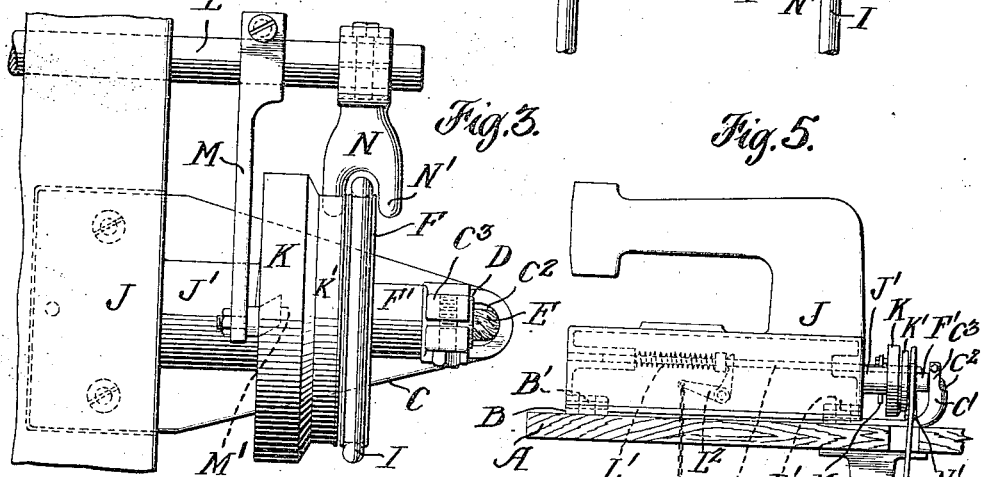
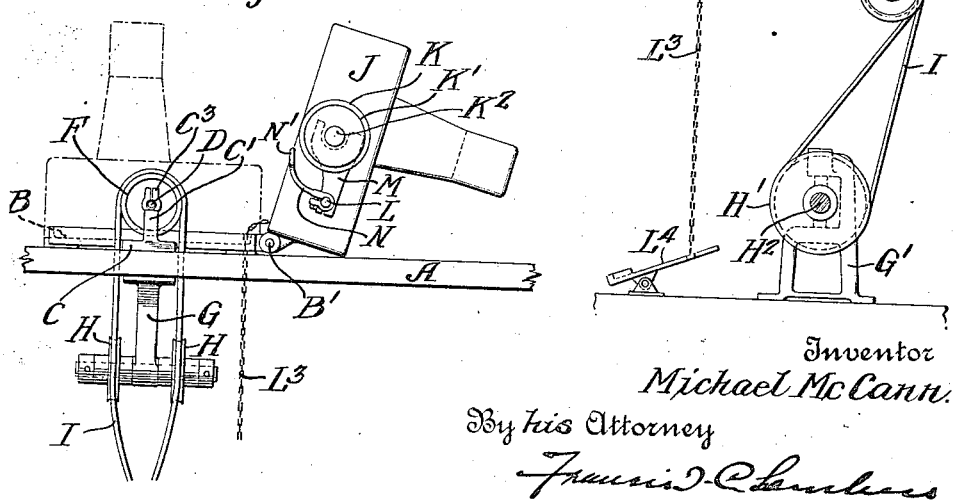
Inventor
Michael McCann.
By his Attorney Patented Jan. 30, 1923.

1,443,793

UNITED STATES PATENT OFFICE.

MICHAEL McCANN, OF GLENMORRIS, NEW YORK, ASSIGNOR TO FREDERICK OSANN COMPANY, OF NEW YORK, N. Y., A CORPORATION OF NEW YORK.

DRIVING MECHANISM FOR LIGHT MACHINES.

Application filed August 18, 1921. Serial No. 493,500.

*To all whom it may concern:*

Be it known that I, MICHAEL MCCANN, a citizen of the United States of America, residing in Glenmorris, L. I., in the county of Queens and State of New York, have invented certain new and useful Improvements in Driving Mechanism for Light Machines, of which the following is a true and exact description, reference being had to the accompanying drawings, which form a part thereof.

My invention relates to light machines, typically sewing machines, and has for its object to provide for the hinging of the machine casing to its bed plate or support so that it can be turned over to expose the bottom of the machine, and, at the same time, to provide the machine with driving mechanism of the fast and loose pulley type which will permit the turning over of the machine without disconnecting the driving belt from the loose pulley.

The nature of my improvements will be best understood as described in connection with the drawings in which they are illustrated and in which—

Figure 1 is an elevation, partly in section, showing one end of a machine casing and bed plate and a fast and loose pulley construction by which the machine is driven.

Figure 2 is an end elevation of the mechanism shown in Fig. 1.

Figure 3 is a plan view of the mechanism shown in Figs. 1 and 2.

Figure 4 is an end elevation showing the machine casing turned over to expose the bottom of the machine.

Figure 5 is a side elevation showing the machine in operative position and the mechanism for driving the machine and for actuating the belt shifter.

A, Figs. 4 and 5, is the table upon which the machine is supported; B is the bed plate of the machine which is provided at one side with the hinged eyes indicated at B' in Figs. 4 and 5. C indicates an arm firmly secured to the bed plate B having an upwardly turned end indicated at C' provided, as shown, with clamping forks $C^3$. $C^2$ indicates an oil cup formed in the upwardly turned portion of the arm C. D is a bearing stud for the loose pulley which is firmly secured in place and in alignment with the driving shaft of the machine between the clamping arms $C^3$. As shown, the stud or bearing is made hollow, as indicated at D', and provided with the perforation $D^2$ for the oiling of the bearing. E is a wick extending from the oil cup $C^2$ into the hollow portion D' of the stud D. F is a loose pulley turning on the stud D. G, see Figs. 4 and 5, is a bracket extending downward from the table A and supporting the belt pulleys H H. G' is a shaft bracket supporting the driving shaft $H^2$ and the belt holder H'. I indicates the belt, J indicates the casing of the machine hinged at its side, as indicated in Figs. 4 and 5, to the hinge eyes B'. J' indicates the bearing extension of the casing through which passes the driving shaft indicated at $K^2$ in Fig. 4. K indicates a stop disc and K' a fast pulley both secured to the driving shaft $K^2$. L indicates a longitudinally movable rod having bearings in the machine casing and normally pressed toward the right, as shown in Fig. 5, by a spring L'. $L^2$ is a bell crank lever by which the rod L is shifted toward the left, the lever $L^2$ being actuated by a chain $L^3$ and treadle $L^4$. To this rod is secured a laterally extending arm M having a toe or projection M' for engaging the stop disc K and to this rod is also secured the arm N having a forked end indicated at N' which, when the machine is in operative position, engages the belt I, as is indicated in Figs. 2 and 3.

The stud or bearing D for the loose pulley is firmly held in fixed position in which it will register with the end of the driving shaft $K^2$ when the machine is in operative position and the forked end N' of the belt shifting arm N engages the belt I so that when the rod L is shifted toward the left the belt is shifted to the fast pulley K'. When the rod L is released the spring L' operates to shift it toward the right with the result that the belt shifting arm N shifts the belt to the loose pulley at the same time that the motion of the moving parts of the machine is arrested. The operator can then turn the machine casing over to the position indicated in Fig. 4, to permit the ready adjustment of parts of the mechanism accessible from the bottom of the machine and obviously this turning over of the machine can be accomplished without necessitating the disengagement of the belt from the loose pulley or stopping the motion of the belt, the fast pulley simply swinging away from the loose pulley as is clearly shown in Fig. 4.

Having now described my invention, what I claim as new and desire to secure by Letters Patent is,

1. A machine support in combination with a machine casing hinged to said support so that it can be turned over to expose the bottom of the machine, a driving shaft secured in and turning with the casing having a fast belt pulley secured to its end, a fixed pulley bearing located to register with the end of the driving shaft and a loose belt pulley journalled on the fixed bearing in position to register with the fast pulley when the machine is in operative position.

2. A machine bed plate in combination with a machine casing hinged to said bed plate so that it can be turned over to expose the bottom of the machine, a driving shaft secured in and turning with the casing having a fast belt pulley secured to its end, a fixed pulley bearing secured to the bed plate and located to register with the driving shaft when the machine is in operative position on the bed plate and a loose pulley journalled on the fixed pulley bearing.

3. A machine bed plate in combination with a machine casing hinged to said bed plate so that it can be turned over to expose the bottom of the machine, a driving shaft secured in and turning with the casing having a fast belt pulley secured to its end, a fixed pulley bearing secured to the bed plate and located to register with the driving shaft when the machine is in operative position on the bed plate, a loose belt pulley journalled on the fixed pulley bearing, a belt shifter having a belt engaging fork, and means for actuating the belt shifter attached to and moving with the hinged casing.

MICHAEL McCANN.